United States Patent
Liu

(10) Patent No.: US 11,923,720 B1
(45) Date of Patent: Mar. 5, 2024

(54) EMERGENCY LIGHT

(71) Applicant: Guangzhou Jiguang Lighting Co., Ltd., Guangzhou (CN)

(72) Inventor: Xiaoli Liu, Guangzhou (CN)

(*) Notice: Subject to any disclaimer, the term of this patent is extended or adjusted under 35 U.S.C. 154(b) by 0 days.

(21) Appl. No.: 18/315,777

(22) Filed: May 11, 2023

(51) Int. Cl.
| | |
|---|---|
| H02J 9/00 | (2006.01) |
| F21K 9/278 | (2016.01) |
| F21K 9/90 | (2016.01) |
| H02J 9/02 | (2006.01) |
| H05B 45/30 | (2020.01) |
| H05B 45/46 | (2020.01) |

(52) U.S. Cl.
CPC ............... *H02J 9/02* (2013.01); *F21K 9/278* (2016.08); *F21K 9/90* (2013.01); *H05B 45/30* (2020.01); *H05B 45/46* (2020.01)

(58) Field of Classification Search
CPC ........ H02J 9/00; H02J 9/02; H02J 9/04; H02J 9/061; H02J 9/065; H02J 7/00; H02J 7/02; H05B 45/00; H05B 45/30; H05B 45/37; H05B 45/46; H05B 45/50; H05B 47/00; H05B 47/20; F21K 9/278; F21K 9/90
See application file for complete search history.

(56) References Cited

U.S. PATENT DOCUMENTS

| | | | | |
|---|---|---|---|---|
| 5,859,499 | A | * 1/1999 | McAfee | H02J 9/06 |
| | | | | 315/86 |
| 2015/0349586 | A1* | 12/2015 | Rodriguez | H05B 45/38 |
| | | | | 307/23 |
| 2018/0331567 | A1* | 11/2018 | Beghelli | H05B 45/385 |
| 2020/0083741 | A1* | 3/2020 | Wilson | H02J 9/061 |
| 2022/0131409 | A1* | 4/2022 | Zhang | H02J 9/061 |

FOREIGN PATENT DOCUMENTS

| | | | | |
|---|---|---|---|---|
| CN | 211267175 U | * | 8/2020 | |
| GB | 2565600 A | * | 2/2019 | H02J 9/061 |

* cited by examiner

*Primary Examiner* — Thai Pham

(57) ABSTRACT

An emergency light includes a lighting module configured for emitting lights, an input unit configured for receiving a power supply voltage from a home power supply, a normal driving module connected to the input unit to receive the power supply voltage and configured to output a first driving signal to drive the lighting module emit lights when the home power supply is normal; and an emergency control and battery module connected to the two input terminals and the lighting module. The emergency control and battery module is configured for detecting the alternating voltage of the input unit and a resistance value between the two input terminals to determine whether the home power supply failure occurs. When the home power supply failure occurs, the emergency control and battery module provides a second driving signal to drive the lighting module emit lights.

20 Claims, 3 Drawing Sheets

EMERGENCY LIGHT

TECHNICAL FIELD

The present disclosure relates to the field of lights, in particular to an emergency light.

BACKGROUND

An existing emergency light having a built-in battery is usually electrically connected to mains supply via a switch installed on a wall, and it emits lights by using a power of the built-in battery during home power supply (such as mains supply) failure. However, it is difficult to intelligently determine whether home power supply failure has occurred or whether the switch installed on the wall has been turned off. Thus, the emergency light may work when the switch is turned off and the home power supply. This type of product cannot meet real needs of users.

SUMMARY

In order to overcome the shortcomings in the existing emergency light, the present disclosure provides an emergency light which can determine whether home power supply failure has occurred or whether a switch electrically connected to the emergency light has been turned off and emits lights during home power supply failure.

The present disclosure adopts the following technical solution: an emergency light, including a lighting module configured for emitting lights; an input unit configured for receiving an alternating voltage from a home power supply; a rectifying circuit connected to the input unit to receive the alternating voltage and output a first direct voltage; a normal lighting control circuit connected between the rectifying circuit and the lighting module, the normal lighting control circuit configured for receiving the first direct voltage and outputting a first driving signal to drive the lighting module emit lights when the home power supply is normal; a battery; and an emergency lighting control circuit connected to the two input terminals and the battery, the emergency lighting control circuit configured for detecting the alternating voltage of the input unit and a resistance value between the two input terminals to determine whether the home power supply failure occurs, wherein when the home power supply failure occurs, the battery provides a second driving signal to drive the lighting module emit lights.

Further, when the emergency lighting control circuit detects the alternating voltage of the two input terminals is greater than or equal to a first predetermined value, the emergency lighting control circuit determines the home power supply is normal, the light module is turned off; when the emergency lighting control circuit detects the alternating voltage of the two input terminals is less than the first predetermined value, the emergency lighting control circuit further detects the resistance value between the two input terminals, when the resistance value between the two input terminals is less than a second predetermined value, the emergency lighting control circuit determines the home power supply failure occurs, the battery provides a second driving signal to drive the lighting module emit lights.

Further, the lighting module includes a main lighting unit and an emergency lighting unit, the main lighting unit is connected to the normal lighting control circuit and is configured to receive the first driving signal to emit lights, and the emergency lighting unit is configured to receive the second driving signal to emit lights.

Further, the normal lighting control circuit includes a first output terminal configured for outputting the first diving signal, an end of the main lighting unit is connected to the first output terminal, the other end of the main lighting unit is connected to the emergency lighting control circuit or the battery, a voltage of the other end of the main lighting unit is provided to the battery for charging the battery when the main lighting unit emits lights.

Further, the normal lighting control circuit includes a first integrated chip, the first integrated chip includes a ground pin, a chip select pin, a high voltage pin, and at least one data din, the ground pin and the overvoltage protection pin are connected a negative terminal of the rectifying circuit and grounded, the high voltage pin is connected a positive terminal of the rectifying circuit via a first inductor, at least one first capacitor is connected between the high voltage pin and ground, the first output terminal is connected to the high voltage terminal, the data pin is connected to the first output terminal via a second inductor and a second capacitor, a third capacitor is connected between a node between the second inductor and the second capacitor and the ground, a positive electrode of a zener diode is connected the node between the second inductor and the second capacitor, and a negative electrode of the zener diode is connected to the first output terminal.

Further, the normal lighting control circuit further includes a first integrated chip, the first integrated chip includes a ground pin, a chip select pin, a high voltage pin, and at least one data din, the ground pin is connected a negative terminal of the rectifying circuit and grounded, the high voltage pin is connected a positive terminal of the rectifying circuit and an end of the main lighting unit, at least one first capacitor is connected between the high voltage pin and ground, the first output terminal is connected to the high voltage terminal, the data pin is connected to the first output terminal via a second inductor and a second capacitor, a positive electrode of a zener diode is connected to the data pin, and a negative electrode of the zener diode is connected to the high voltage pin.

Further, the emergency light further includes a diode, a positive electrode of the diode is connected to the other end of the main lighting unit, and a negative electrode of the diode is connected to the emergency lighting control circuit.

Further, the emergency lighting unit is connected between the other end of the main lighting unit and ground, the emergency lighting unit is configured to be shorted when the battery is charging by the voltage of the other end of the main lighting unit, and the emergency lighting unit is driven to emit light by the voltage of the other end of the main lighting unit when the battery is full.

Further, the emergency lighting unit includes a divider and at least one light element, the divider is connected between the other end of the main lighting unit and an end of the at least one light element, the other end of the at least one light element is grounded.

Further, the divider includes a first LED, a positive electrode of the first LED is connected the other end of the main lighting unit, and a negative electrode of the first LED is connected to the end of the at least one light element.

Further, the divider further includes a second LED parallel with the first LED, a positive electrode of the second LED is connected the other end of the main lighting unit, and a negative electrode of the second LED is connected to the end of the at least one light element.

Further, the at least one lighting element includes a plurality of third LEDs connected in parallel.

Further, the main lighting unit includes a plurality of first LED groups connected in series, each first LED group includes a plurality of fourth LEDs connected in parallel.

Further, the number of the plurality of first LED groups is five, the number of the plurality of fourth LEDs of each LED group is three, the number of the first LEDs of the emergency lighting unit is eighteen.

Further, the main lighting unit further includes a plurality of second LED groups connected in series, each second LED group includes a plurality of fifth LEDs connected in parallel, the emergency light further includes a switch element, a first terminal of the switch element is connected the first output terminal, a second terminal of the switch element is connected an end of the first LED groups, a third terminal of the switch element is connected an end of the second LED groups, the other end of the first LED groups and the other end of the second LED groups are connect to the emergency lighting unit to output the voltage for charging the battery, the switch element is configured to electrically connect the first terminal to the second terminal or electrically connect the first terminal to the third terminal.

Further, the input unit includes a first input terminal configured for receiving a live wire signal of the home power supply and a second input terminal configured for receiving a null wire signal of the home power supply; the emergency lighting control circuit includes a second integrated chip, the second integrated chip includes a first pin, a second pin, an enable pin, a power pin and a battery pin, the first pin is connected to the first input terminal, the second pin is connected to the second input terminal, the enable pin is connected to the end of the at least one light element and an end of the divider away from the main lighting unit, the battery pin is connected to a positive electrode of the battery, and a negative electrode of the battery is grounded, the battery is configured to provide the second driving signal to the battery pin, such that the power pin outputs the second driving signal, and the voltage of the other end of the main lighting unit is provided to the battery via the power pin and the battery pin.

Further, the emergency lighting control circuit further includes a plurality of resistors connected in parallel, each resistor is connected between the enable pin and the end of the divider away from the main lighting unit.

Further, the input unit includes a first input terminal configured for receiving a live wire signal of the home power supply and a second input terminal configured for receiving a null wire signal of the home power supply; the emergency lighting control circuit includes a second integrated chip, a first transistor and a second transistor, the second integrated chip includes a first pin, a second pin, an enable pin, a first battery pin, and a second battery pin, the first pin is connected to the first input terminal, the second pin is connected to the second input terminal, the enable pin is connected to a control terminal of the first transistor, a first terminal of the first transistor is connected to a control terminal of the second transistor, a second terminal of the first transistor is grounded, a first terminal of the second transistor is connected to a first battery pin, a positive electrode of the battery and the other end of the main lighting unit, a second terminal of the second transistor is connected to the end of the at least one light element and an end of the divider away from the main lighting unit, a negative electrode of the battery is connected to a second battery pin, when the home power supply is normal, the first transistor and the second transistor are turned off under the controls of the second integrated chip, the voltage of the other end of the main lighting unit is provided to the battery to charging the batter; when the home power supply failure occurs, the second integrated chip turns on the first transistor, and the second transistor is turned on, the battery provides the second driving signal to at least one lighting element such that the least one lighting element emits lights.

Further, the first transistor is a NPN type transistor, and the second transistor is a PMOS.

The present disclosure also adopts the following technical solution: An emergency light including a lighting module configured for emitting lights; an input unit including two input terminals configured for receiving a power supply voltage from a home power supply; a normal driving module connected to the input unit to receive the power supply voltage and configured to output a first driving signal to drive the lighting module emit lights when the home power supply is normal; and an emergency control and battery module connected to the input unit and the lighting module, the emergency control and battery module configured for detecting the power supply voltage of the input unit and a resistance value between the two input terminals to determine whether the home power supply failure occurs, wherein when the home power supply failure occurs, the emergency control and battery module provides a second driving signal to drive the lighting module emit lights.

The present disclosure has the beneficial effects: by detecting the alternating voltage of the two input terminals and a resistance value between the two input terminals, when the home power supply failure occurs, the emergency lighting control circuit or the emergency control and battery module outputs a second driving signal to drive the lighting module emit lights, such that the emergency light can work whether the switch is turned on or turned off when the home power supply failure occurs and does not work when the home power supply is normal. Thus, this type of product can meet real needs of users.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
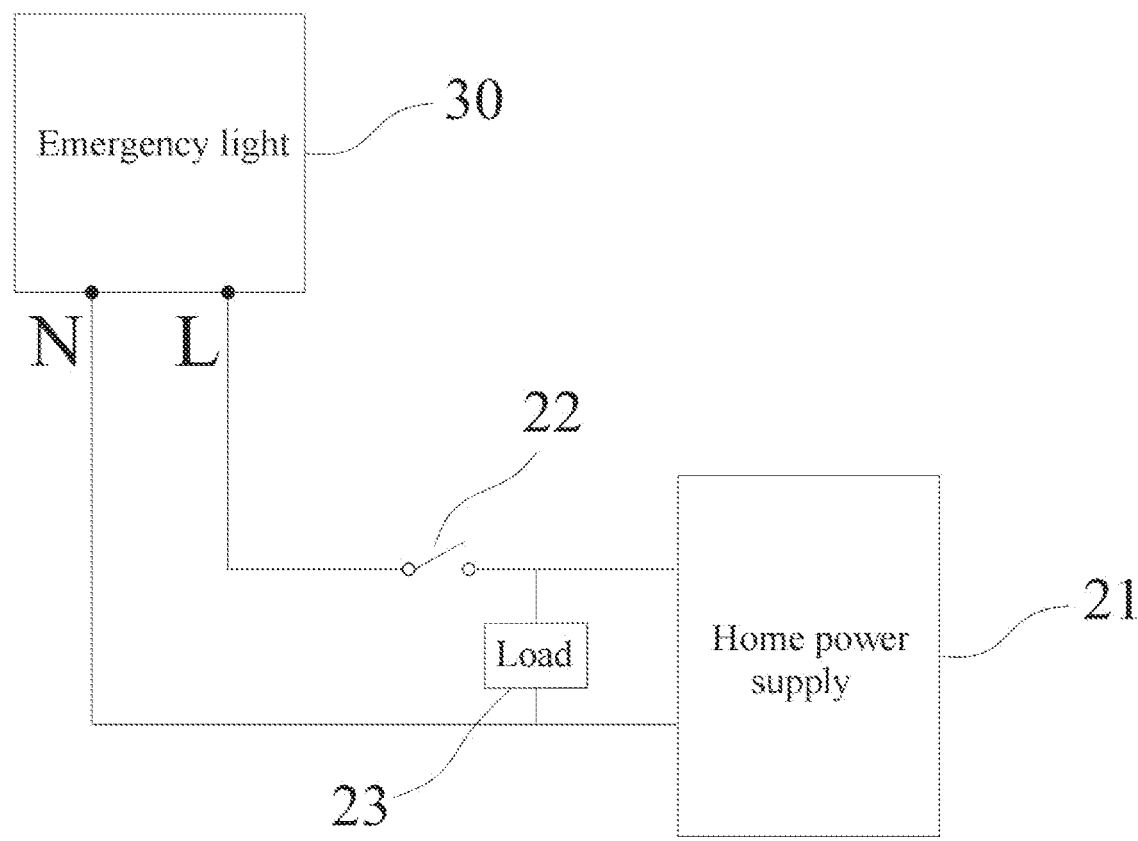
FIG. 1 is a circuit block diagram of a household lighting circuit including an emergency light of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Referring to FIG. 1, a household lighting circuit 10 includes a home power supply 21, a switch 22, a load 23 and an emergency light 30. The home power supply 21 may be a mains supply and is configured to provide a power supply voltage (such as an alternating voltage). A first terminal (such a null wire terminal) of the home power supply 21 is connect to an end of the switch 22, the other end of the switch 22 is connect to the emergency light 30, a second terminal (such a live wire terminal) of the home power supply 21 is connect to the emergency light 30. The switch 22 may be installed on a wall of a user's house and is configured to control the emergency light 30 when the home power supply 21 is normal. The load 23 may be at least one household appliance, and two ends of the load 23 are connected to the first terminal and the second terminal of the home power supply 21 respectively.

Figure 2:
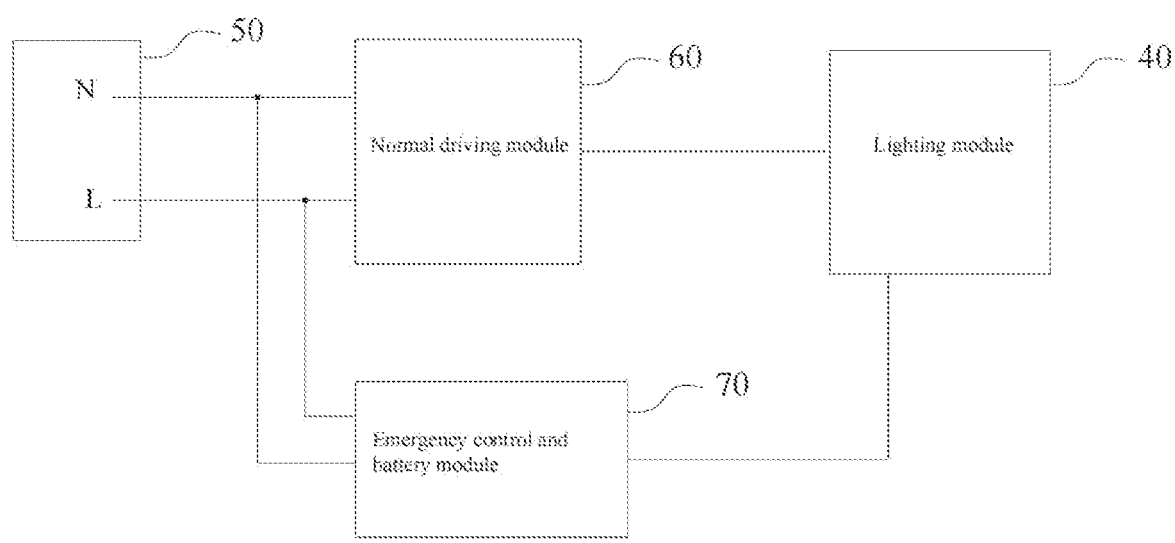
FIG. 2 is a circuit block diagram of the emergency light of FIG. 1.

Referring to FIG. 2, the emergency light 30 includes a lighting module 40 configured for emitting lights, an input unit 50 configured for receiving the power supply voltage from the home power supply 21, a normal driving module 60 connected to the input unit 50 to receive the power supply voltage and configured to output a first driving signal to drive the lighting module 40 emit lights when the home power supply 21 is normal; and an emergency control and battery module 70 connected to the input unit 50 and the lighting module 40.

The emergency control and battery module 70 is configured for detecting the alternating voltage of the input unit and a resistance value between the two input terminals N and L of the input unit 50 to determine whether the home power supply failure occurs. When the home power supply failure occurs, the emergency control and battery module 70 provides a second driving signal to drive the lighting module 40 emit lights.

It can be understood, referring FIG. 1 and FIG. 2, the emergency control and battery module 70 includes a battery 71 and an emergency lighting control circuit 72 connected to the two input terminals N and L of the input unit 50 and the battery 71.

When the home power supply 21 is normal, the emergency lighting control circuit 72 detects the alternating voltage of the two input terminals N and L is greater than or equal to a first predetermined value (such as 20V), the emergency lighting control circuit determines the home power supply is normal, the light module 40 is turned off.

When the emergency lighting control circuit 72 detects the alternating voltage of the two input terminals N and L is less than the first predetermined value, the emergency lighting control circuit 72 further detects the resistance value between the two input terminals N and L, when the resistance value between the two input terminals N and L is less than a second predetermined value, the emergency lighting control circuit 72 determines the home power supply failure occurs, the battery 71 provides a second driving signal to drive the lighting module 40 emit lights. The second predetermined value can range from 500k ohms to 800k ohms, such as 600k ohms.

It can be understood, when the emergency lighting control circuit 72 detects the alternating voltage of the two input terminals N and L is less than the first predetermined value, and the switch 22 is turned on, the emergency lighting control circuit 72 provides a driving voltage from the battery 71 to the two input terminals N and L, such that a circuit loop can be formed by the switch 22, a load 23 and an emergency light 30, then the emergency lighting control circuit 72 can detect a current between the two input terminals N and L, the resistance value between the two input terminals N and L can be calculated by the driving voltage from the battery 71 and the current between the two input terminals N and L, this is the resistance value is detected by the emergency lighting control circuit 72. Due to the circuit loop, when the switch 22 is turned on, the resistance value between the two input terminals N and L will be less than the second predetermined value, such that the emergency lighting control circuit 72 determines the home power supply failure occurs, and the light module 40 emits lights by the second driving signal.

When the switch 22 is turned off, whether home power supply failure occurs or not, the emergency lighting control circuit 72 detects the alternating voltage of the two input terminals N and L is less than the first predetermined value, and detects the resistance value between the two input terminals N and L is infinity and is greater than the second predetermined value due to circuit breaking forming by the switch 22, such that the emergency lighting control circuit 72 turns off the light module 40. As such, the switch 22 can turn on and turn off the emergency light 30, this product can meet real needs of users.

The input unit 50 is configured for receiving the alternating voltage from the home power supply 21. The input unit 50 includes a first input terminal L configured for receiving the live wire signal of the home power supply 21 and a second input terminal N configured for receiving a null wire signal of the home power supply 21.

Figure 3:
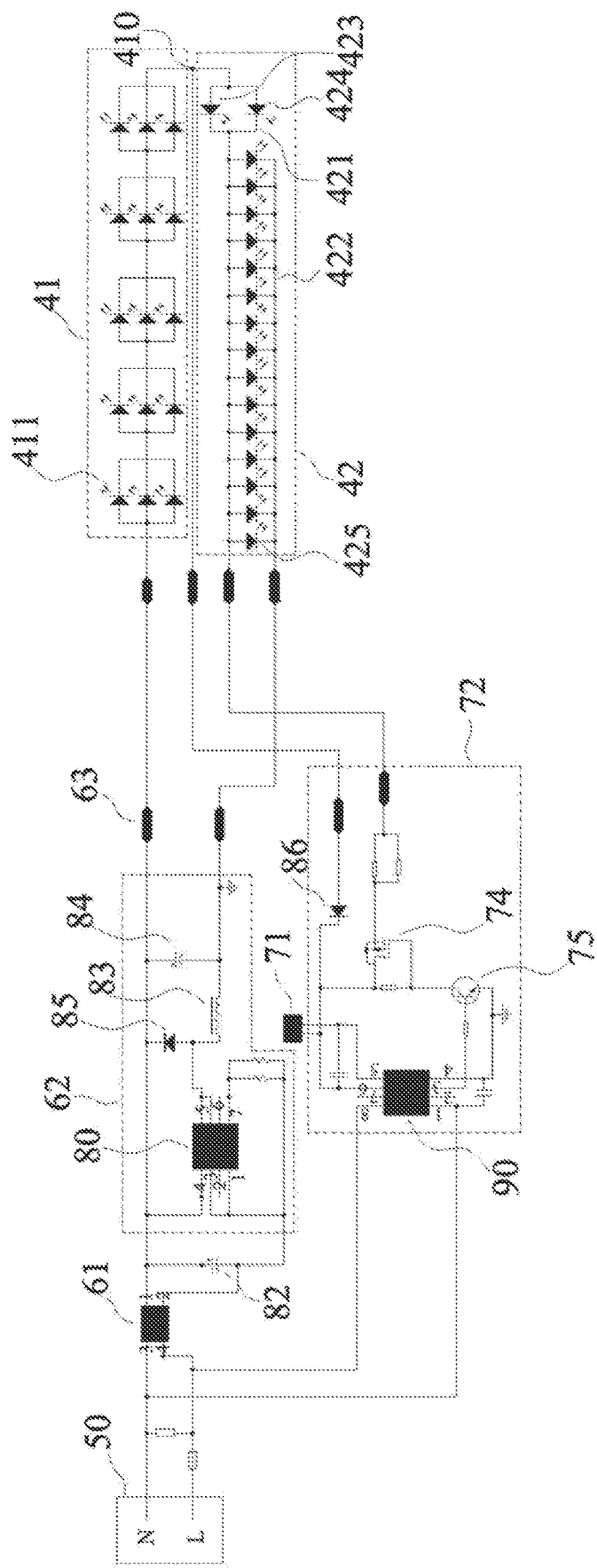
FIG. 3 is a circuit diagram of the emergency light of FIG. 2 according to a first embodiment of the present disclosure.
Figure 4:
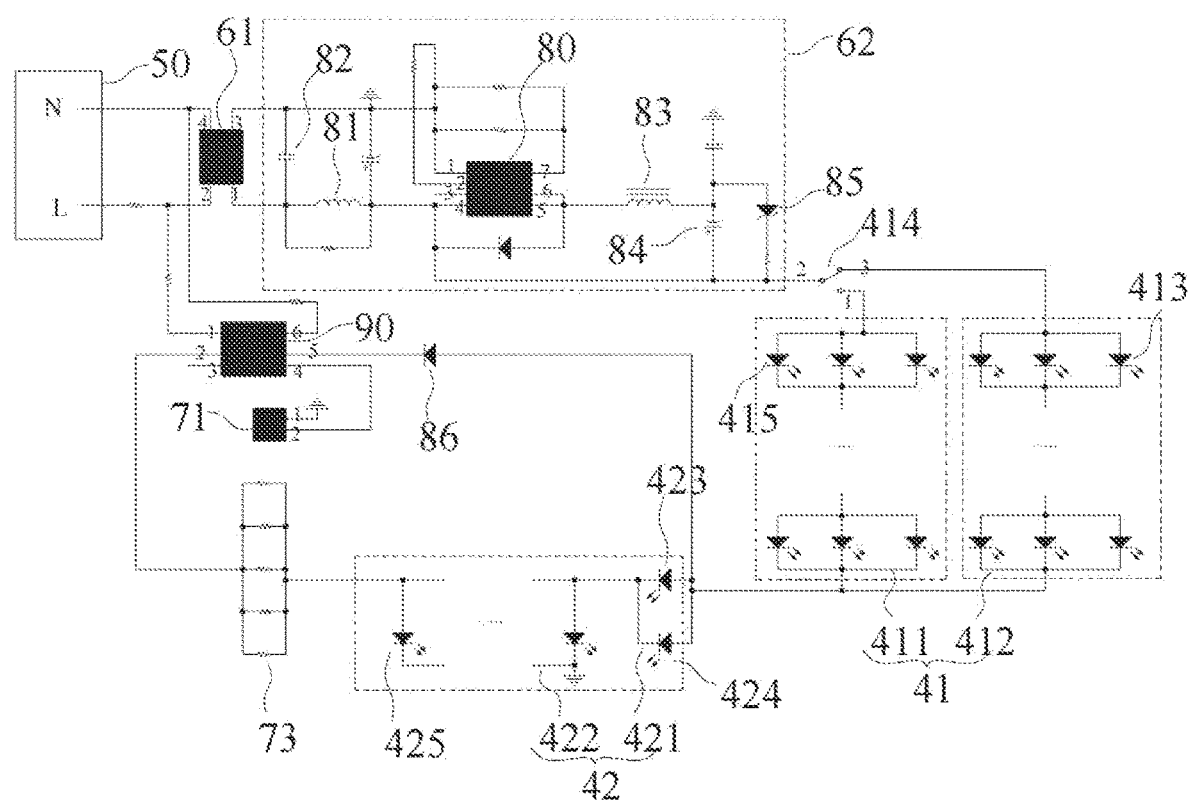
FIG. 4 is a circuit diagram of the emergency light of FIG. 2 according to a second embodiment of the present disclosure.

Referring to FIG. 3 and FIG. 4, the normal driving module 60 includes a rectifying circuit 61 connected to the input unit to receive the alternating voltage and output a first direct voltage and a normal lighting control circuit 62 connected between the rectifying circuit 61 and the lighting module 40. The normal lighting control circuit is configured for receiving the first direct voltage and outputting a first driving signal to drive the lighting module 40 emit lights when the home power supply 21 is normal.

The emergency lighting control circuit 72 is configured for detecting the alternating voltage of the input unit 50. When the home power supply 21 failure occurs, the battery 71 provides a second driving signal to drive the lighting module 40 emit lights.

The lighting module 40 includes a main lighting unit 41 and an emergency lighting unit 42. The main lighting unit 41 is connected to the normal lighting control circuit 62 and is configured to receive the first driving signal to emit lights, and the emergency lighting unit 42 is configured to receive the second driving signal to emit lights.

The normal lighting control circuit 62 includes a first output terminal 63 configured for outputting the first diving signal, an end of the main lighting unit is connected to the first output terminal 63. The other end 410 of the main lighting unit 41 is connected to the emergency lighting control circuit 72 or the battery 71, a voltage of the other end 410 of the main lighting unit 41 is provided to the battery 71 for charging the battery 71 when the home power supply 21 is normal and the main lighting unit 41 emits lights.

Referring to FIG. 3, in a first embodiment, the normal lighting control circuit 62 includes a first integrated chip 80. The first integrated chip 80 includes a ground pin GND, an overvoltage protection pin OVP, a chip select pin CS, a high voltage pin HV, and at least one data din D. The ground pin GND and the overvoltage protection pin OVP are connected a negative terminal of the rectifying circuit 61 and grounded. The high voltage pin HV is connected a positive terminal of the rectifying circuit 61 via a first inductor 81, at least one first capacitor 82 is connected between the high voltage pin HV and ground. The first output terminal 63 is connected to the high voltage terminal HV, the data pin D is connected to the first output terminal 63 via a second inductor 83 and a second capacitor 84, a third capacitor 85 is connected between a node between the second inductor 83 and the second capacitor 84 and the ground. A positive electrode of a zener diode 85 is connected the node between the second inductor 83 and the second capacitor 84, and a negative electrode of the zener diode 85 is connected to the first output terminal 63. A positive electrode of a first diode 86 is connected the data pin D, a negative electrode of the first diode 86 is connected the high voltage pin HV. A positive electrode of the second diode 87 is connected to the other end of the main lighting unit 41, and a negative electrode of the second diode 87 is connected to the emergency lighting control circuit 61.

Referring to FIG. 4, in a second embodiment, the normal lighting control circuit 62 further includes a first integrated chip 80, the first integrated chip 80 includes a ground pin GND, a chip select pin CS, a high voltage pin HV, and at least one data din D. The ground pin GND is connected to a negative terminal of the rectifying circuit 61 and grounded, the high voltage pin HV is connected a positive terminal of the rectifying circuit 61 and an end of the main lighting unit 41. At least one first capacitor 82 is connected between the high voltage pin HV and ground, the first output terminal 63 is connected to the high voltage terminal HV, the data pin D is connected to the first output terminal 63 via a second inductor 83 and a second capacitor 84, a positive electrode of a zener diode 85 is connected to the data pin D, and a negative electrode of the zener diode 85 is connected to the high voltage pin HV.

The emergency lighting unit 42 is connected between the other end 410 of the main lighting unit 41 and ground, the emergency lighting unit 42 is configured to be shorted when the battery 71 is charging by the voltage of the other end 410 of the main lighting unit 41, and the emergency lighting unit 42 is driven to emit light by the voltage of the other end 410 of the main lighting unit 41 when the battery 71 is full.

In the embodiments, the emergency lighting unit 42 includes a divider 421 and at least one light element 422, the divider 421 is connected between the other end 410 of the main lighting unit 41 and an end of the at least one light element 422, the other end of the at least one light element is 422 grounded.

The divider 421 includes a first LED 423 and a second LED 424, a positive electrode of the first LED 423 is connected the other end of the main lighting unit 41, and a negative electrode of the first LED 423 is connected to the end of the at least one light element 422, a positive electrode of the second LED 424 is connected the other end of the main lighting unit 41, and a negative electrode of the second LED 424 is connected to the end of the at least one light element 422.

The at least one lighting element 422 includes a plurality of third LEDs 425 connected in parallel. The main lighting unit 41 includes a plurality of first LED groups 411 connected in series, each first LED group 411 comprises a plurality of fourth LEDs 415 connected in parallel.

In the embodiments, the first direct voltage is about 36V, the number of the plurality of first LED groups is five, the number of the plurality of fourth LEDs of each LED group is three, the number of the first LEDs of the emergency lighting unit is eighteen. When the main lighting unit 41 emits, the voltage of the other end 410 of the main lighting unit 41 ranges from 4V to 6V.

Referring to FIG. 3, in the first embodiment, the main lighting unit 41 further includes a plurality of second LED groups 412 connected in series. Each second LED group 412 includes a plurality of fifth LEDs 413 connected in parallel. The emergency light 41 further includes a switch element 414. A first terminal of the switch element b414 is connected the first output terminal 63, a second terminal of the switch element 414 is connected an end of the first LED groups 411, and a third terminal of the switch element 414 is connected an end of the second LED groups 412. The other end of the first LED groups 411 and the other end of the second LED groups 412 are connect to the emergency lighting unit 42 to output the voltage for charging the battery 71. The switch element 414 is configured to electrically connect the first terminal to the second terminal or electrically connect the first terminal to the third terminal.

Referring to FIG. 3, in the first embodiment, the emergency lighting control circuit 72 includes a second integrated chip 90. The second integrated chip 90 includes a first pin VL, a second pin VN, an enable pin EN, a power pin VDD and a battery pin BAT. The first pin VL is connected to the first input terminal L, the second pin VN is connected to the second input terminal N. The enable pin EN is connected to the end of the at least one light element 422 and an end of the divider 411 away from the main lighting unit 41. The battery pin BAT is connected to a positive electrode of the battery 71, and a negative electrode of the battery 71 is grounded, the battery 71 is configured to provide the second driving signal to the battery pin BAT, such that the power pin VDD outputs the second driving signal. It can be understood, the voltage of the other end of the main lighting unit 41 is provided to the battery 71 via the power pin VDD and the battery pin BAT.

In the first embodiment, the emergency lighting control circuit 72 further includes a plurality of resistors 73 connected in parallel, each resistor 73 is connected between the enable pin EN and the end of the divider 421 away from the main lighting unit 41.

Referring to FIG. 4, in the second embodiment, the emergency lighting control circuit 72 includes a second integrated chip 90, a first transistor 75 and a second transistor 74. The second integrated chip 90 includes a first pin VL, a second pin VN, an enable pin EN, a first battery pin B+, and a second battery pin B−. The first pin VL is connected to the first input terminal L, the second pin VN is connected to the second input terminal N. The enable pin EN is connected to a control terminal of the first transistor 75, a first terminal of the first transistor 75 is connected to a control terminal of the second transistor 74, and a second terminal of the first transistor 75 is grounded. A first terminal of the second transistor 74 is connected to a first battery pin B+, a positive electrode of the battery 71 and the other end 410 of the main lighting unit 41, a second terminal of the second transistor 74 is connected to the end of the at least one light element 422 and an end of the divider 421 away from the main lighting unit 41, a negative electrode of the battery 71 is connected to a second battery pin B.

In the second embodiment, when the home power supply 21 is normal, the first transistor 75 and the second transistor 74 are turned off under the controls of the second integrated chip 80, the voltage of the other end 410 of the main lighting unit 41 is provided to the battery 71 to charging the battery 71; and when the home power supply failure occurs, the second integrated chip 80 turns on the first transistor 73, and the second transistor 74 is also turned on, the battery 71 provides the second driving signal to at least one lighting element 422 such that the least one lighting element 422 emits lights. The first transistor 73 is a NPN type transistor, and the second transistor 74 is a PMOS.

The present disclosure has the beneficial effects: by detecting the alternating voltage of the input unit 50, when the home power supply failure occurs, the emergency lighting control circuit 62 outputs a second driving signal to drive the lighting module 40 emit lights, such that the emergency light 30 can work whether the switch 22 is turned on or turned off when the home power supply failure occurs, and the emergency light 30 does not work when the home power supply 21 is normal. Thus, this type of the product can meet real needs of users. he night vision equipment 10 is simple in structure, convenient to use and reasonable in design.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. An emergency light, comprising
a lighting module configured for emitting lights;
an input unit comprising two input terminals configured for receiving an alternating voltage from a home power supply;
a rectifying circuit connected to the input unit to receive the alternating voltage and output a first direct voltage;
a normal lighting control circuit connected between the rectifying circuit and the lighting module, the normal lighting control circuit configured for receiving the first direct voltage and outputting a first driving signal to drive the lighting module emit lights when the home power supply is normal;
a battery; and
an emergency lighting control circuit connected to the two input terminals and the battery, the emergency lighting control circuit configured for detecting the alternating voltage of the input unit and a resistance value of a load connected between the two input terminals to determine whether the home power supply failure occurs, wherein when the home power supply failure occurs, the emergency lighting control circuit and the battery provides a second driving signal to drive the lighting module emit lights, when the emergency lighting control circuit detects the alternating voltage of the two input terminals is greater than or equal to a first predetermined value, the emergency lighting control circuit determines the home power supply is normal, the light module is turned off; when the emergency lighting control circuit detects the alternating voltage of the two input terminals is less than the first predetermined value, the emergency lighting control circuit further detects the resistance value between the two input terminals, when the resistance value between the two input terminals is less than a second predetermined value, the emergency lighting control circuit determines the home power supply failure occurs, the battery provides a second driving signal to drive the lighting module emit lights, the first predetermined value is a voltage value, and the second predetermined value is a resistance value.

2. The emergency light according to claim 1, wherein the first predetermined value is 20V.

3. The emergency light according to claim 1, wherein the lighting module comprises a main lighting unit and an emergency lighting unit, the main lighting unit is connected to the normal lighting control circuit and is configured to receive the first driving signal to emit lights, and the emergency lighting unit is configured to receive the second driving signal to emit lights.

4. The emergency light according to claim 3, wherein the normal lighting control circuit comprises a first output terminal configured for outputting the first diving signal, an end of the main lighting unit is connected to the first output terminal, the other end of the main lighting unit is connected to the emergency lighting control circuit or the battery, a voltage of the other end of the main lighting unit is provided to the battery for charging the battery when the main lighting unit emits lights.

5. The emergency light according to claim 4, wherein the normal lighting control circuit comprises a first integrated chip, the first integrated chip comprises a ground pin, a chip select pin, a high voltage pin, and at least one data din, the ground pin and the overvoltage protection pin are connected a negative terminal of the rectifying circuit and grounded, the high voltage pin is connected a positive terminal of the rectifying circuit via a first inductor, at least one first capacitor is connected between the high voltage pin and ground, the first output terminal is connected to the high voltage terminal, the data pin is connected to the first output terminal via a second inductor and a second capacitor, a third capacitor is connected between a node between the second inductor and the second capacitor and the ground, a positive electrode of a zener diode is connected the node between the second inductor and the second capacitor, and a negative electrode of the zener diode is connected to the first output terminal.

6. The emergency light according to claim 4, wherein the normal lighting control circuit further comprises a first integrated chip, the first integrated chip comprises a ground pin, a chip select pin, a high voltage pin, and at least one data din, the ground pin is connected a negative terminal of the rectifying circuit and grounded, the high voltage pin is connected a positive terminal of the rectifying circuit and an end of the main lighting unit, at least one first capacitor is connected between the high voltage pin and ground, the first output terminal is connected to the high voltage terminal, the data pin is connected to the first output terminal via a second inductor and a second capacitor, a positive electrode of a zener diode is connected to the data pin, and a negative electrode of the zener diode is connected to the high voltage pin.

7. The emergency light according to claim 4, wherein the emergency light further comprises a diode, a positive electrode of the diode is connected to the other end of the main lighting unit, and a negative electrode of the diode is connected to the emergency lighting control circuit.

8. The emergency light according to claim 4, wherein the emergency lighting unit is connected between the other end of the main lighting unit and ground, the emergency lighting unit is configured to be shorted when the battery is charging by the voltage of the other end of the main lighting unit, and the emergency lighting unit is driven to emit light by the voltage of the other end of the main lighting unit when the battery is full.

9. The emergency light according to claim 8, wherein the emergency lighting unit comprises a divider and at least one light element, the divider is connected between the other end of the main lighting unit and an end of the at least one light element, the other end of the at least one light element is grounded.

10. The emergency light according to claim 9, wherein the divider comprises a first LED, a positive electrode of the first LED is connected the other end of the main lighting unit, and a negative electrode of the first LED is connected to the end of the at least one light element.

11. The emergency light according to claim 10, wherein the divider further comprises a second LED parallel with the first LED, a positive electrode of the second LED is connected the other end of the main lighting unit, and a negative electrode of the second LED is connected to the end of the at least one light element.

12. The emergency light according to claim 10, wherein the at least one lighting element comprises a plurality of third LEDs connected in parallel.

13. The emergency light according to claim 12, wherein the main lighting unit comprises a plurality of first LED groups connected in series, each first LED group comprises a plurality of fourth LEDs connected in parallel.

14. The emergency light according to claim 13, wherein the number of the plurality of first LED groups is five, the number of the plurality of fourth LEDs of each LED group is three, the number of the first LEDs of the emergency lighting unit is eighteen.

15. The emergency light according to claim 12, wherein the main lighting unit further comprises a plurality of second LED groups connected in series, each second LED group comprises a plurality of fifth LEDs connected in parallel, the emergency light further comprises a switch element, a first terminal of the switch element is connected the first output terminal, a second terminal of the switch element is connected an end of the first LED groups, a third terminal of the switch element is connected an end of the second LED groups, the other end of the first LED groups and the other end of the second LED groups are connect to the emergency lighting unit to output the voltage for charging the battery, the switch element is configured to electrically connect the first terminal to the second terminal or electrically connect the first terminal to the third terminal.

16. The emergency light according to claim 9, wherein the two input terminals comprise a first input terminal configured for receiving a live wire signal of the home power supply and a second input terminal configured for receiving a null wire signal of the home power supply; the emergency lighting control circuit comprises a second integrated chip, the second integrated chip comprises a first pin, a second pin, an enable pin, a power pin and a battery pin, the first pin is connected to the first input terminal, the second pin is connected to the second input terminal, the enable pin is connected to the end of the at least one light element and an end of the divider away from the main lighting unit, the battery pin is connected to a positive electrode of the battery, and a negative electrode of the battery is grounded, the battery is configured to provide the second driving signal to the battery pin, such that the power pin outputs the second driving signal, and the voltage of the other end of the main lighting unit is provided to the battery via the power pin and the battery pin.

17. The emergency light according to claim 16, wherein the emergency lighting control circuit further comprises a plurality of resistors connected in parallel, each resistor is connected between the enable pin and the end of the divider away from the main lighting unit.

18. The emergency light according to claim 9, wherein the two input terminals comprise a first input terminal configured for receiving a live wire signal of the home power supply and a second input terminal configured for receiving a null wire signal of the home power supply; the emergency lighting control circuit comprises a second integrated chip, a first transistor and a second transistor, the second integrated chip comprises a first pin, a second pin, an enable pin, a first battery pin, and a second battery pin, the first pin is connected to the first input terminal, the second pin is connected to the second input terminal, the enable pin is connected to a control terminal of the first transistor, a first terminal of the first transistor is connected to a control terminal of the second transistor, a second terminal of the first transistor is grounded, a first terminal of the second transistor is connected to a first battery pin, a positive electrode of the battery and the other end of the main lighting unit, a second terminal of the second transistor is connected to the end of the at least one light element and an end of the divider away from the main lighting unit, a negative electrode of the battery is connected to a second battery pin,
  when the home power supply is normal, the first transistor and the second transistor are turned off under the controls of the second integrated chip, the voltage of the other end of the main lighting unit is provided to the battery to charging the battery;
  when the home power supply failure occurs, the second integrated chip turns on the first transistor, and the second transistor is turned on, the battery provides the second driving signal to at least one lighting element such that the least one lighting element emits lights.

19. The emergency light according to claim 18, wherein the first transistor is a NPN type transistor, and the second transistor is a PMOS.

20. An emergency light, comprising
  a lighting module configured for emitting lights;
  an input unit comprising two input terminals configured for receiving a power supply voltage from a home power supply;
  a normal driving module connected to the input unit to receive the power supply voltage and configured to output a first driving signal to drive the lighting module emit lights when the home power supply is normal; and an emergency control and battery module connected to the two input terminals and the lighting module, the emergency control and battery module configured for detecting the alternating voltage of the input unit and a resistance value of a load connected between the two input terminals to determine whether the home power supply failure occurs, wherein when the home power supply failure occurs, the emergency control and battery module provides a second driving signal to drive the lighting module emit lights, when the emergency control and battery module detects the alternating voltage of the two input terminals is greater than or equal to a first predetermined value, the emergency control and battery module determines the home power supply is normal, the light module is turned off; when the emergency lighting control circuit detects the alternating voltage of the two input terminals is less than the first predetermined value, the emergency control and battery module further detects the resistance value between the two input terminals, when the resistance value between the two input terminals is less than a second predetermined value, the emergency control and battery module determines the home power supply failure occurs and provides a second driving signal to drive the lighting module emit lights, the first predetermined value is a voltage value, and the second predetermined value is a resistance value.

* * * * *